United States Patent
Knepler et al.

(10) Patent No.: US 7,182,017 B1
(45) Date of Patent: Feb. 27, 2007

(54) BEVERAGE SERVER WITH BEVERAGE DETECTOR

(75) Inventors: John T. Knepler, Springfield, IL (US); Victor D. Goeckner, Auburn, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 160 days.

(21) Appl. No.: 10/418,801

(22) Filed: Apr. 18, 2003

Related U.S. Application Data (60) Provisional application No. 60/373,434, filed on Apr. 18, 2002.

(51) Int. Cl.
*A47J 31/00* (2006.01)

(52) U.S. Cl. .......................... 99/279; 99/285; 340/618; 340/620

(58) Field of Classification Search .................. 99/279, 99/290, 285; 340/620, 618
See application file for complete search history.

(56) References Cited

U.S. PATENT DOCUMENTS

| | | | |
|---|---|---|---|
| 4,025,846 A * | 5/1977 | Franz et al. .................. 324/671 |
| 4,464,981 A | 8/1984 | Stover | |
| 4,591,839 A * | 5/1986 | Charboneau et al. ......... 340/620 |
| 4,978,833 A | 12/1990 | Knepler | |
| 5,019,690 A | 5/1991 | Knepler | |
| 5,038,752 A | 8/1991 | Anson | |
| 5,186,399 A | 2/1993 | Knepler | |
| 5,245,915 A | 9/1993 | Ford | |
| 5,375,508 A | 12/1994 | Knepler | |
| 5,395,515 A | 3/1995 | Ford | |
| 5,422,976 A | 6/1995 | Knepler | |
| 5,505,845 A | 4/1996 | Ford | |
| 6,393,966 B1 | 5/2002 | Hart | |
| 6,595,107 B2 | 7/2003 | Hart | |
| 6,766,728 B2 * | 7/2004 | Fogagnolo et al. ........... 99/280 |

* cited by examiner

*Primary Examiner*—Reginald L. Alexander
(74) *Attorney, Agent, or Firm*—Barnes & Thornburg LLP

(57) ABSTRACT

Disclosed is a conductivity detector assembly for use with a beverage preparation apparatus as well as a hot water dispensing apparatus. The conductivity detecting assembly includes a non-conductive spacer for spacing apart a first conductive portion and a second conductive portion. A conductive path extends through the non-conductive spacer connecting the first and second conductive portions. An exterior surface of the non-conductive spacer is provided in a configuration, for example a generally conical shape with sloped sides, for shedding liquid away from the first conductive portion. A conductive circuit is completed when liquid is retained in the reservoir, the level at which contact can be made between the first conductive portion and a corresponding interior surface or conductive portion of the reservoir. When the conductive circuit is broken the conductivity detector provides a signal to a controller associated with the device indicating that the level has dropped below the level at which the first conductive portion is positioned in the reservoir. Also disclosed are methods for use of the conductivity detector assembly and methods for cleaning a beverage preparation apparatus or a hot water dispenser employing the conductivity detector assembly.

10 Claims, 5 Drawing Sheets

BEVERAGE SERVER WITH BEVERAGE DETECTOR

CROSS-REFERENCE

This application claims priority under 35 U.S.C. 119(e) to U.S. Provisional Application Ser. No. 60/373,434 filed Apr. 18, 2002 which is expressly incorporated herein by reference.

BACKGROUND

This disclosure relates generally to conductive beverage detectors and methods of using such detectors with apparatus such as beverage producing apparatus and hot water dispensers.

Beverage apparatus and hot water dispensers many include one or more detectors in any of a number of forms which may include a probe extending through the top of the reservoir associated with the apparatus. The probes extend into the reservoir to detect the presence or absence of liquid in the reservoir. Extending a level probe through the top of the reservoir, or in the case of a coffee brewing apparatus, a server, requires one or more rather long probes attached to the lid of the server and electrical contacts extending from the lid to the beverage preparation apparatus. These long probes may be damaged in use and the contacts are prone to becoming damaged. Additionally, the contacts and associated wires extending from the top are typically in the way during the loading of the server and may be susceptible to damage and may be aesthetically undesirable. The problem with such probes is exacerbated when a low level needs to be detected. Detection of the low level requires that the probe extend to a bottom area of the reservoir making the probe rather long especially in large volume servers.

Similarly, hot water dispensers may be provided with level probes to detect the volume of water retained in the dispenser. Such dispensers may sense low levels by use of an elongated probe as well as upper levels or high levels using a shorter probe. Regardless, multiple probes may be required. Such probes may require cleaning as the result of accumulation of lime on the exterior surface of the probe. As such, the probes may be prone to damage during the cleaning process thereby interfering with the proper operation of such probes and the associated hot water dispenser.

The present disclosure provides a beverage preparation apparatus, hot water dispenser or other liquid container with at least one liquid or conductivity detector assembly, an embodiment of the detector assembly and methods of using the assembly with a beverage preparation apparatus or hot water dispenser. One embodiment of the liquid container according to the present disclosure includes a reservoir, a conductivity detector assembly disposed in a bottom area of the reservoir, and a controller to control the operation of or relating to the reservoir or container. The reservoir holds a volume of a liquid such as a beverage prepared for consumption. The conductivity detector assembly senses when the level of the liquid in the container drops below a predetermined level. For example, in a beverage server the controller manages the brewing, serving, rinsing, and draining of the beverage server.

The conductivity detector assembly can be placed at the bottom or side of the liquid container. The conductivity detector assembly is a conductive contact placed in the container at a desired location and could take any number of forms including, but not limited to, a protruding structure or a flexible strip conductor. For example, the protruding structure could include a relatively short upwardly extending probe placed in the bottom area having an exposed conductive portion at a desired location, for example, with 12–16 ounces of liquid remaining in the container. Alternatively, a flexible strip conductor might extend through the bottom or side of the container with an exposed portion of the conductor placed at the desired position or level within the container.

The conductivity detector assembly is connected to the controller to provide control information relating to the volume or quantity of liquid remaining in the reservoir. The container can communicate to a monitoring station in the facility, such as in a cafeteria, convenience store, or central reporting station to report the status of the volume or quantity of beverage in the reservoir.

In one embodiment, a beverage server includes a conductivity detector assembly mounted in the bottom area of a server reservoir. The detector extends upward from the bottom of the reservoir towards a lid attached to the server. The conductive tip of the detector becomes exposed when, for example, less than approximately 16 oz. of liquid is remaining in the reservoir. The principle of operation for this embodiment of the detector is conductivity. The detector signals the brewer and the monitoring system that the server product volume or quantity is low.

The low level detector also can be utilized in an automated server rinse feature. Server rinse can be manually initiated or it automatically occurs following an automatic server dump that occurs at the end of a programmable freshness holding time period (for example set to 90 minutes) or freshness "time out". The server automatically drains itself at freshness time-out, the duration of opening of the drain valve depends on the quantity of beverage in the reservoir as detected by the low level detector. The reservoir is then filled with hot water, held for a period of time (for example 30 seconds) and drained again, repeating the draining procedure above.

In another embodiment, the detector is mounted in a bottom of a side reservoir of a hot water dispensing device. In such a hot water dispensing device it may be desirable to detect when the quantity of liquid in the reservoir is low or near empty. The detector, coupled to the controller, can detect when the low level occurs without the need for a long probe extending from the top. This detection signal can be used to allow access to the reservoir during a cleaning cycle. For example, an operator can initiate a cleaning cycle to drain the reservoir so that the interior surfaces can be cleaned. In response to the initiation of the cleaning cycle, the controller commands the hot water dispenser to drain the reservoir. Draining the reservoir allows access to the interior surfaces of the reservoir for manual cleaning. A lockout feature can be provided on the hot water dispenser such that an access panel to the reservoir cannot be opened, as a result of an electro-mechanical interlock coupled to the controller and the access panel, until the reservoir is sufficiently drained. Once the reservoir is sufficiently drained, as sensed by the detector, the controller disengages the interlock to allow the access panel to be opened.

Additional features will become apparent to those skilled in the art upon consideration of the following detailed description of drawings exemplifying the best mode as presently perceived.

BRIEF DESCRIPTION OF THE DRAWINGS

The detailed description particularly refers to the accompanying figures which are given as a non-limiting example only in which.

The exemplifications set out herein illustrate embodiments of the disclosure that are not to be construed as limiting the scope of the disclosure in any manner.

DESCRIPTION OF EMBODIMENTS OF THE INVENTION

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Figure 1:
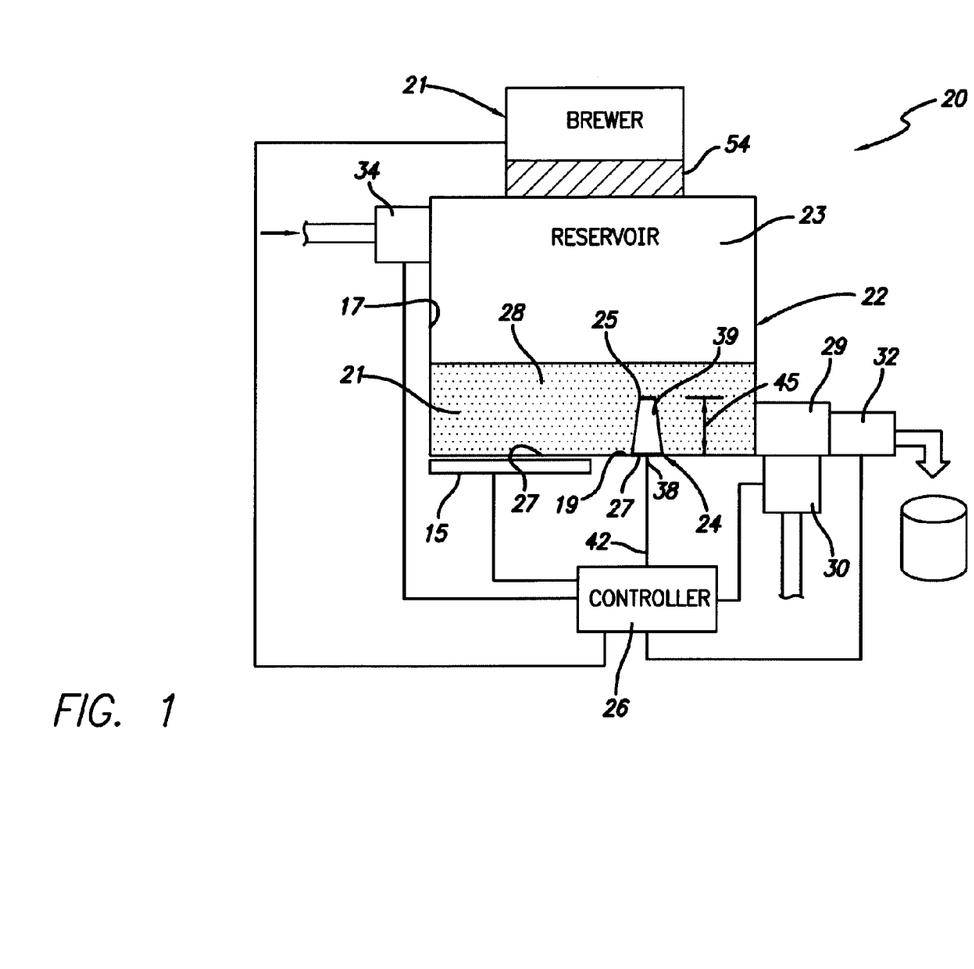
FIG. 1 is a diagrammatic illustration of an embodiment of a beverage producing apparatus having a beverage server with a beverage detector structure attached to a bottom area of a reservoir in the server.

As diagrammatically shown in FIG. 1, the present disclosure provides a beverage producing apparatus, referenced generally as 20, with a conductivity detector assembly or beverage detector structure 24. One embodiment of beverage producing apparatus 20 according to the present invention includes a brewer 21, a server 22 having a reservoir 23 with a controllable heating or warming element 15, a detector 24 positioned in the reservoir 23, and a controller 26 to control the operation of beverage producing apparatus 20. It should be noted that a device such as shown in the diagrammatic illustrations herein could provide a space between an outer surface of the reservoir 23 and an inner surface of the server body 22. Such a space is provided as a thermal break between the reservoir 23 and the server 22 to facilitate better heat retention of the liquid 28 retained in the reservoir. Alternatively, the space can be filled with an insulating material to help further enhance the heat retention properties.

Brewer 21 is shown diagrammatically and produces a beverage 28 by passing hot water through grounds 54. An example of such a brewer might be of the type such as manufactured by Bunn-O-Matic Corporation, Springfield, Ill., in which the brewer operation is controlled, at least in part, by the controller 26. Reservoir 23 contains a volume or quantity of beverage 28 prepared for consumption. As beverage is dispensed from the server, beverage detector 24 senses when the volume or level of beverage 28 drops below a predetermined quantity in reservoir 23. Controller 26 manages the brewing, dispensing, rinsing, and draining of the reservoir 23 beverage server 20 using information from beverage detector 24, an input water valve 34, a drain valve 30, a dispense valve 32. Drain valve 30 and dispense valve 32 are connected to reservoir 23 through manifold 29. As beverage is dispensed into the reservoir 23, beverage detector 24 senses when the quantity or volume of beverage 28 rises above a predetermined level. In other words, the beverage detector 24 detects the presence or absence of beverage in the reservoir.

Beverage detector 24 is placed in the bottom area 21 such as in the bottom 19 (FIG. 1) or side 17 (FIG. 2) of reservoir 23 in server 22. Beverage detector 24 uses conductivity to sense the presence or absence of beverage 28 in reservoir 23 and could take any number of forms including, but not limited to, a probe protruding structure, or a flexible strip conductor with one or two separate conductors. If beverage detector 24 has only one conductor, the conductivity between a first conductive portion 25 and a second similar conductive portion 27 or conductive portion of the reservoir 23 is detected. In one form, an upwardly extending protrusion is placed in the bottom of reservoir 23 having an exposed conductive portion 25 at a desired location, such as to detect the condition of less than 12–16 ounces of beverage 28 remaining in the reservoir 23. Alternatively, a flexible strip conductor might extend through the bottom 19 or side 17 of reservoir 23 with an exposed portion of the conductor placed at the desired position within reservoir 23 generally relating to a desired volume or quantity of beverage to be sensed.

Figure 4:
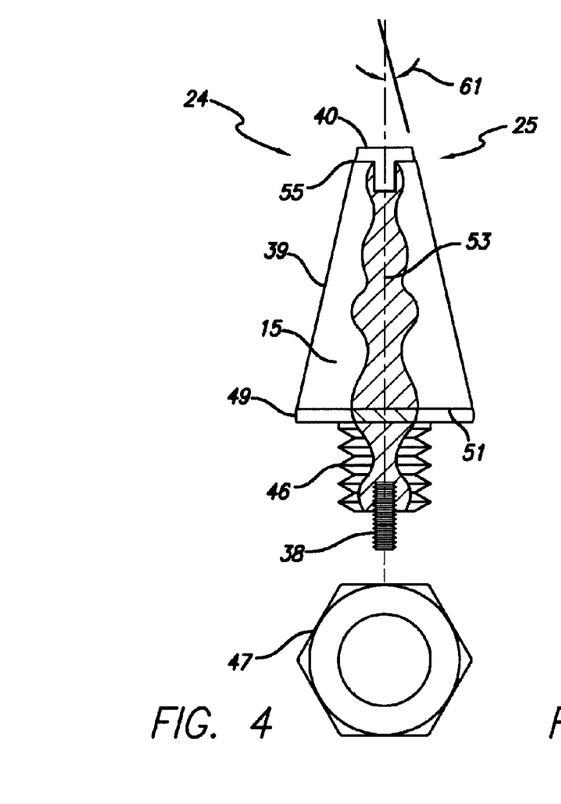
FIG. 4 is an exploded perspective view of a conductivity detector assembly.

As shown in FIG. 4, beverage detector structure or assembly 24 includes the first conductive portion 25 and a second conductive portion or connection portion 38. The first conductive portion 25 includes at least one conductive contact 40 which is exposed to the presence or absence of beverage 28 (FIGS. 1–2) in the reservoir 23. The second conductive portion 38 includes a threaded shaft extending from a non-conductive riser portion 39. The second conductive portion can be coupled to a line 42 which is connected to the controller 26.

An attachment assembly 44 includes a threaded shoulder 46 on the spacer 39 and a nut 47. The nut 47 is engageable with the threaded shoulder 46 for attaching the detector assembly 24 to the reservoir 23. A sealing ring 49 is provided at a base end 51 to seal the detector 24 in the reservoir 23. A conductive path 53 is connected to the conductive contact 40 and the second conductive portion 38. As such, when positioned in the reservoir, the first conductive portion 25 provides a conductive path through the non-conductive riser 39 to the second conductive portion 38.

The first conductive portion 25 extends from a first end 55 of the spacer 39 and the second conductive portion 38 extends from the second end or base 51. It should be noted that other means for attaching the detector 24 to the reservoir 23 could be used instead of the threaded shoulder 46 and nut 47. Those of skill in the art will appreciate that there are a variety of mechanical and adhesive ways to attach such a structure to a reservoir to permit a conductive path to extend from the first conductive portion 25 to the second conductive portion 38.

The non-conductive riser portion 32 can be formed out of any suitable non-conductive material which can be positioned, placed, molded or otherwise disposed around the first conductive portion 25 and the contact extending from conductive portion 25 to the connector 38. In this regard, the non-conductive riser portion 39 provides a sealed non-conductive barrier between the first conductive portion 25 and the second conductive portion 38. This helps to maintain the integrity of the signal sensed by the detector 24 such that liquid is not being sensed at any location along the path 53 between the first conductive portion 25 and the connector 38.

It should also be noted that the non-conductive riser portion 39 is shown as a generally conical shaped structure having sloped external surfaces 15. The sloped surfaces 15 have an angular 61 range of from 0 degrees to approximately 60 degrees relative to a central axis 63 of the detector 24. The generally conical shape as shown in FIG. 4 is highly stable and resists damage when cleaning the interior surface of the reservoir. In this regard, it may be necessary from time to time to manually clean an interior surface of the reservoir especially a reservoir such as will be disclosed with regard to FIG. 6. In this regard, a broad relatively wide second end 53 and a generally narrow first end 55 provides an additional benefit of a stable structure which resists movement when bumped.

However, the non-conductive riser or means for spacing the probe sensor 25 away from a surface 19, 17, could be any of a variety of shapes that suitably sheds water away from the probe sensor 25. One of the objectives of the spacing means 39 is to prevent bridging of liquid between the probe sensor 25 and the corresponding conductive surface 27. In this regard, if bridging can be avoid a more accurate and robust signal can be detected and provided to the controller 26. The shedding of the liquid from the spacing means 39 helps to eliminate false level signals.

Figure 2:
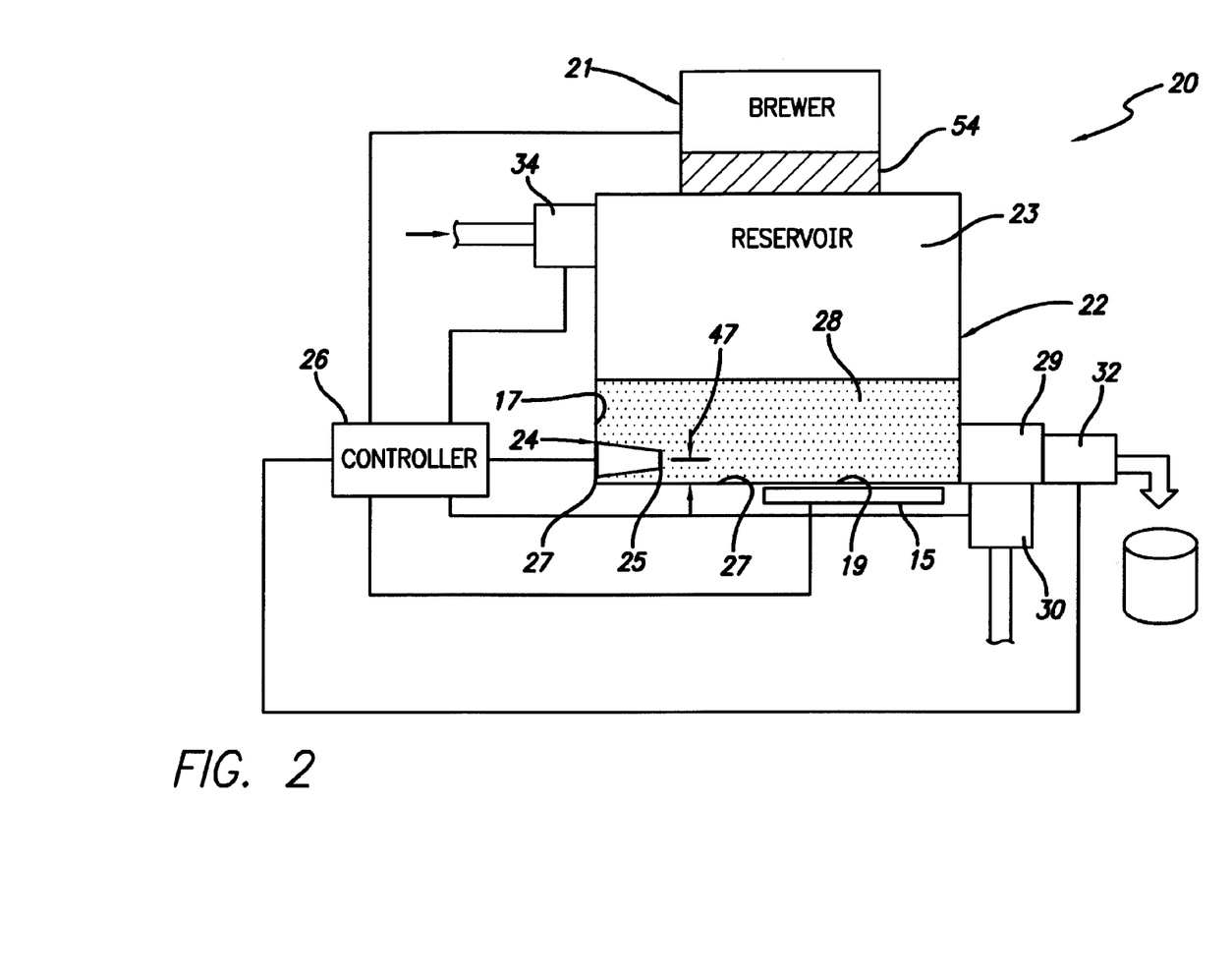
FIG. 2 is a diagrammatic illustration of another embodiment of the beverage server with the beverage detector attached to the side of the reservoir.

As shown in the Figures, the generally non-conductive riser portion 39 provides a dimension 45 or spacing (FIG. 1) which generally relates to a volume of beverage 28 retained in the reservoir 23. The riser 39 has sloped sides to facilitate draining or shedding of beverage from the exterior surface thereof. The beverage detector 24 as shown in FIG. 2 is mounted on a side 17 of the reservoir 23. Similarly, the first conductive portion 25 is spaced 47 a dimension above the bottom of the reservoir 23 generally relates to a quantity or volume of beverage retained in the reservoir.

Beverage detector 24 is installed in reservoir 23 by inserting from the interior of reservoir 23, the threaded portion 44 of the connecting portion 38 through a hole in reservoir 23. Nut 46 is then attached to threaded portion 44 to secure beverage detector 24 to reservoir 23. The sealing ring 47 or other similar device is used to insure that the connection between beverage detector 24 and reservoir 23 does not leak. Electrical contact 42 is wired to controller 26 which contains circuits capable of detecting continuity between a pair of conductive points 25, 27. Controller 26 then provides control information relating to the volume of beverage 28 remaining in reservoir 23. This information can be used in the operation of beverage server 20 and can be communicated via a transmitter 48 to a monitoring station 50 in the facility, such as in a cafeteria or convenient store, to report the status of the volume of beverage 28 in the reservoir 23. Such a system is disclosed in PCT publication no. WO 02/097759 A1, assigned to the assignee of the present application, and which is incorporated herein by reference in its entirety.

Figure 3:
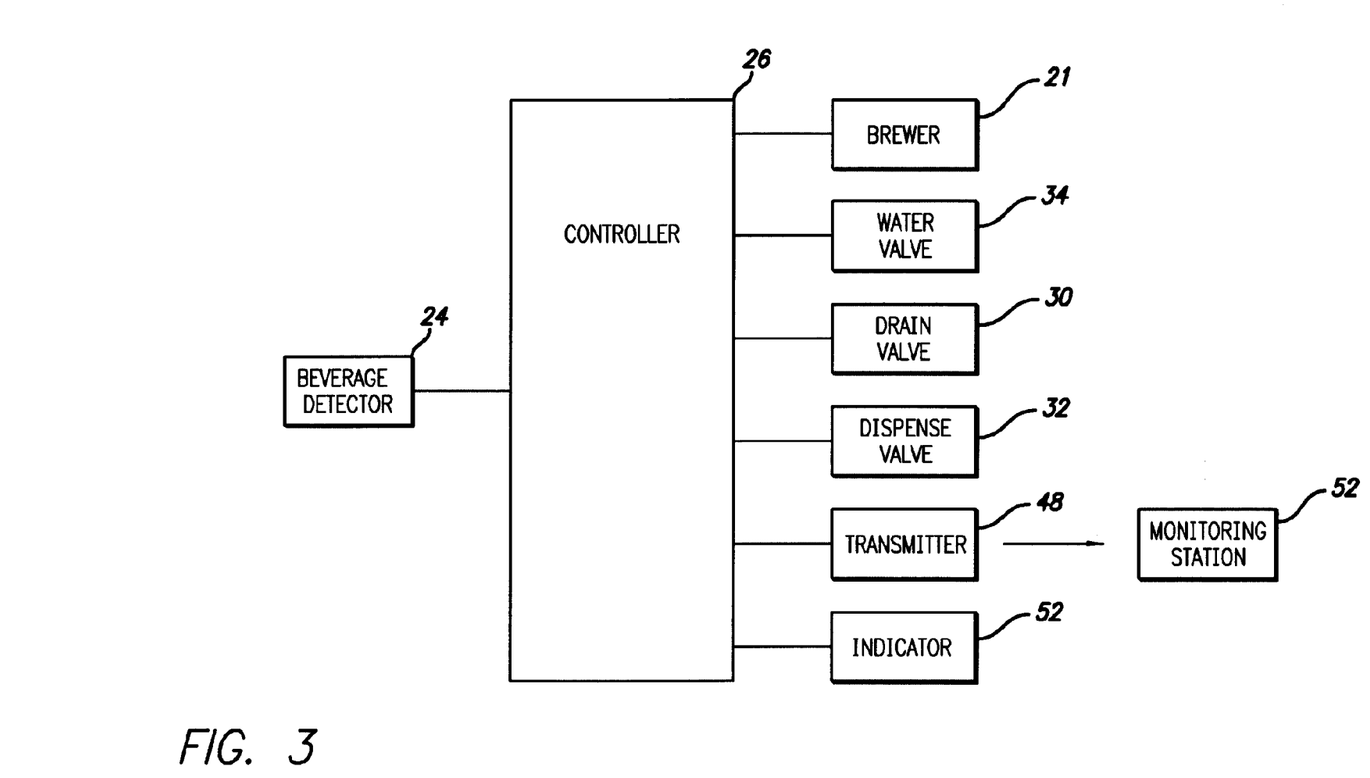
FIG. 3 is a simplified block diagram of one embodiment of the controller circuit of the beverage producing apparatus.

With reference to FIG. 3, controller 26 can be programmed to provide for a number of the functions of beverage producing apparatus 20, such as brewing, dispensing, holding, rinsing, and draining. All of these functions use information from beverage detector 24, in the form of the presence or absence of a conductivity signal. For example, controller 26 is programmed to allow beverage 28 to be held in reservoir 23 for only a predetermined amount of time after brewing to avoid the dispensing of a substandard product. This hold time can be selected by the operator or preprogrammed by the manufacturer based on industry, or other criteria. At the end of the hold time, a warning is communicated indicating that the server is going to drain any beverage 28 remaining in reservoir 23 and that dispensing will not be allowed during this transition period. The warning can be in the form of an indicator 52, such as a flashing light or report screen, at the brewer as well as at monitoring station 50.

A server rinse cycle can occur as a result of the timed out draining period. The server rinse cycle will initiate the draining of the server, rinsing of the server and then processing a new brew cycle, if appropriate. At the end of the warning time, for example five minutes, dispense valve 32 will be locked out preventing further dispensing from server 20. After dispense valve 32 has been locked out, drain valve 30 is opened. This allows beverage 28 to drain from reservoir 23. If the level of beverage 28 in reservoir 23 is below that sensed by beverage detector 24, drain valve 30 will open for a short predetermined period of time to allow the quantity of beverage 28 to drain. If the quantity of beverage 28 retained in reservoir 23 is greater that the level indicated by beverage detector 24, drain valve 30 will open for a longer period of time sufficient to drain the entire reservoir 23. Differentiation of these times will help minimize the amount of time required to drain, rinse and brew a beverage.

After reservoir 23 has been drained, clean hot water will be dispensed to reservoir 23 through water valve 34 to provide a sanitation/rinse cycle. The clean hot water will fill reservoir 23 and be held for a predetermined period of time, for example, 30 seconds. After the sanitation/rinse cycle, the rinse water will be drained from reservoir 23 through drain valve 30. At the conclusion of the period of time for draining rinse water from reservoir 23, a new brew cycle will be permitted to be initiated. Prior to this time, controller 26 will lock out and prevent further brewing to avoid brewing fresh coffee on top of outdated coffee and to avoid brewing fresh coffee into rinse water.

With regard to the brewing of beverage 28, it is undesirable to brew fresh beverage on top of old beverage which is beyond its predetermined hold time. As discussed above the present disclosure prevents this situation. If, however, the beverage retained in the reservoir is of sufficient quantity and has not gone beyond the hold time, it may be desirable to brew fresh beverage into the reservoir while beverage remains therein. The brewing of beverage can be generally continuous so that during peak beverage demand hours the operator does not run out of beverage. However, if the beverage is beyond the hold time, it may be more desirable to dump the old beverage and rinse the reservoir 23 and then brew fresh beverage even if some quantity of beverage is wasted to ensure the dispensing of a high quality guaranteed fresh beverage. These parameters can be programmed into the controller using this disclosure and programmable controllers known in the art.

Controller 23 can also be programmed so that the rinse cycle is not initiated until a convenient low traffic hour. For example, a timer can be provided in the programmable controller 26 which can be set to prevent or lock out a rinse cycle during a particular range of time. For example, the rinse cycle may be locked out for a period from 6 a.m.–9 a.m. and from 11 a.m.–1 p.m. and for 3 p.m.–7 p.m. These locked out times will prevent the rinse cycle from occurring during what might be considered to be peak hours for some convenience store locations. These peak hours might coincide with morning, afternoon and evening rush hours, dining periods or other periods which might be significant to a particular user. It might be important to maximize brewing capacity and production during these hours and operating a rinse cycle would be counterproductive to this objective. It is not required to run the rinse cycle after every brewing cycle. The operator may desire to operate the automatic server rinse cycle whenever the hold time is exceeded to insure that any remaining old beverage will be automatically rinsed from the server and prevent contamination of the new beverage.

An additional feature of the controller 26 is that when a new brew cycle is initiated, the dispensing of the beverage is delayed until the entire brew cycle is finished or until some predetermined period of time or quantity of beverage is dispensed into the reservoir 23 to prevent dispensing beverage with inconsistent flavor. For example, if a cup of beverage is dispensed from the server 22 at the very start of a brew cycle it is likely that this beverage would be weak, because, for example, the grounds for brewing the beverage at the initiation of the brew cycle are not fully saturated. As such, only the exterior superficial flavors and solids will be rinsed from the grounds during the initial portion of the brew cycle. However, once the grounds are fully saturated more and more varied flavors and solids will be rinsed from the grounds adding more flavor and complexity to the brewed beverage. With the foregoing in mind, the beverage producing apparatus 20 can be programmed at the controller 26 to allow dispensing at the valve before, or in other words, activating the valve 34, only after a particular period of time has elapsed from the initiation of the brew cycle. As such, there may be some period of time after which the operator feels that sufficient quality beverage can be dispensed before the end of the brew cycle. However, it is possible that the operator may wish to prevent any dispensing until the entire brew cycle has been completed. The dispense valve 34 is coupled to the control valve 35 to provide this control feature.

Another benefit of the present disclosure is that the beverage detector is retained generally in the bottom area 21 of the reservoir 23. This eliminates the long probes attached to the lid of the server and contacts extending from the reservoir 23 that need to be manually coupled when the reservoir lid is removed and returned. The long probes have a tendency to become bent or otherwise damaged. Additionally with the sensor retained in the bottom area 21 of the reservoir 23, it is cleansed during rinsing cycles thereby further increasing the sanitation of the device. In contrast, the long probes extending from the lid into the server may not necessarily be rinsed thoroughly or during every rise cycle as a result of the potential for their removal during the rinsing of the reservoir 23.

Figure 5:
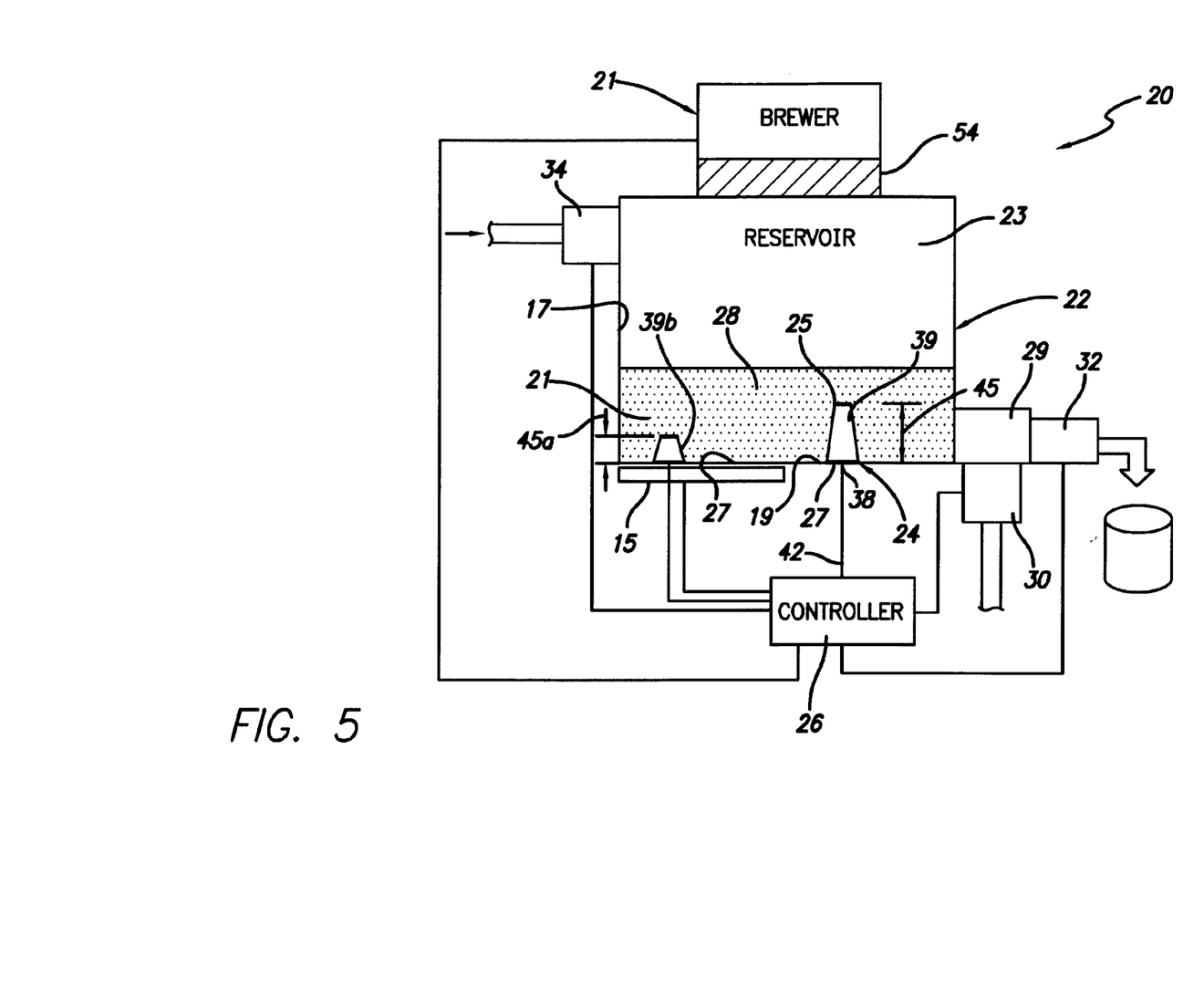
FIG. 5 is a diagrammatic illustration similar to FIG. 1 showing the reservoir in which multiple beverage detector structures are used.

FIG. 5 shows an embodiment of the disclosure which incorporates two detectors 39, 39b the detectors can be used to provide the conductive link or circuit or can be used to detect different liquid levels 45, 45a.

It is envisioned that the brewer 21 mentioned in this disclosure is to be broadly interpreted. The brewer 21 may take the form of a beverage dispenser which may create a beverage other than by means of brewing. For example, beverages may be brewed or created by means of a concentrated powder or freeze-dried substance which is mixed with water or other reconstituting or diluting substance. Similarly, a liquid or syrup concentrate may be used to produce a beverage, while looking and tasting like a freshly brewed beverage, such concentrates are not actually brewed in the sense of infusing a beverage brewing substance such as ground coffee or tea. It should be noted, however, that many of these concentrates may derive from a brewing process by which the brewing substance such as ground coffee or tea is infused. Many of these concentrates are produced by concentrating or otherwise intensifying the material produce the concentrated substance. As such, the term brewer and related terms are considered to be broadly interpreted in the present disclosure.

Similarly, the reference to beverage 28 should be broadly interpreted. For example, a beverage may relate to brewed beverages such as coffee or tea products. Similarly, the beverage or food product contained and retained in the reservoir may take the form of soup, flavored beverages or other food products. Generally, the conductivity principle set forth in the present disclosure is applicable to any other conductive food product which may be retained in a reservoir for dispensing, for example, water as discussed above. The beverage detector 24 detects the presence or absence of the substance in the reservoir 23.

Figure 6:
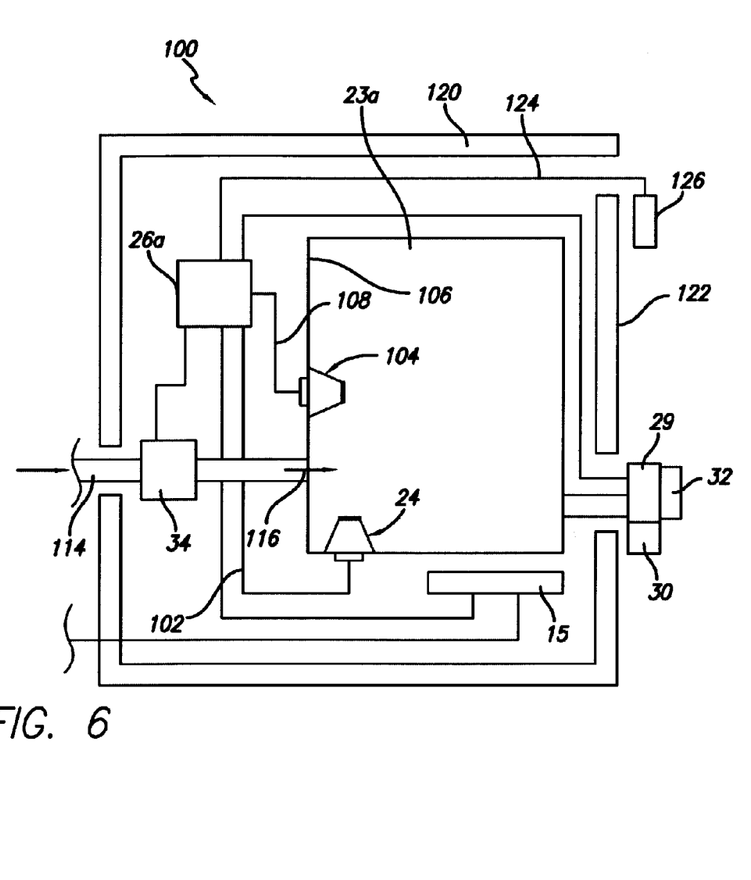
FIG. 6 is a diagrammatic illustration of an embodiment of a hot water dispensing device employing a liquid detector structure as shown and described in FIGS. 1, 2, 4 and 5.

With reference to FIG. 6, a hot water dispensing apparatus 100 is provided. The apparatus includes a reservoir 23a having a liquid detector 24 positioned therein. The liquid detector 24 communicates with the controller 26 over line 102. Optional or alternate location for a single detector or an additional detector 104 is provided on a side wall 106 of the reservoir 23a. The additional detector 104 communicates with the controller 26 over line 108.

The reservoir 23a and associated components operates in generally the same manner as that disclosed above. For example, a heating or warming element 15a is provided and connected to the controller 26a. Additionally, a controllable dispense valve 29 is provided and includes the additional features and operations as described herein above with regard to the disclosure relating to the beverage preparation apparatus. Additionally, a controllable water inlet valve 112 is provided on an inlet line 114 to control the flow of water 116 into the reservoir 23a.

The hot water dispensing apparatus 100 includes a housing 120 having an access panel or door 122 thereon. The access panel 122 is displaceable from the housing 120 to allow an operator access to the reservoir 23a. In this regard, the reservoir may be removable from a cavity 124 defined by the housing 120. Such removal may be necessary in order to allow an operator to clean the interior surfaces of the reservoir 23a such as to remove lime accumulation.

It would be desirable to prevent a user from removing a reservoir which is filled to an operating level. In this regard, the access panel 122 is prevented from opening by use of an interlock device 126. As illustrated, the interlock device 126 is an electro-mechanical switch or other electromechanical device which can be coupled to the controller 26. In this regard, the controller 26 can operate the interlock 126 to allow the access panel 122 to be opened or to prevent opening of the access panel. For example, if a second level detector 104 senses a level of liquid in the reservoir 23a, a controller will prohibit opening of the access panel 122 by maintaining the interlock 126 in a locked position. If the level drops to a suitably low level such as when conductivity broken between the probe tip 25, the controller 26 can allow the interlock 126 to disengage and allow the access panel 122 to be opened.

When opened, an operator can reach inside of the reservoir 23a to clean the associated interior surfaces. The heating and retention of a quantity of hot water tends to result in lime accumulation on interior surfaces of the reservoir 23a. Lime will also accumulate on those areas which are electrically active or conductive such as the detectors 24. As such, by providing the detectors in a robust configuration, in contrast to the long probes used in the prior art, the operator can easily and conveniently clean the interior surfaces including the detectors. This helps to prevent lime accumulation which might otherwise interfere with the detection signal sensed by the liquid detector 24. This also improves the sanitation and operation of the heated water dispenser 100.

While a preferred embodiment of the disclosure is shown and described, it is envisioned that those skilled in the art may devise various modifications and equivalents without departing from the spirit and scope of the disclosure as recited in the following claims.

What is claimed is:

1. A conductivity detector assembly for use with a beverage preparation apparatus for detecting a volume of liquid in a beverage reservoir associated with the beverage preparation apparatus, the conductivity detector assembly comprising:
   a non-conductive spacer having an exterior surface for facilitating shedding of liquid therefrom, the spacer having a first end and a second end;
   an exposed conductive portion positioned on the first end of the spacer;
   an exposed conductive connector extending from the second end of the spacer generally distal the first end;
   a conductive path coupled to the exposed conductive portion and the exposed connector for transmitting a conductivity signal between the exposed conductive portion and the exposed connector; and
   an attaching assembly for attaching the detector assembly to the reservoir with the exposed conductive portion positioned inside the reservoir and the exposed conductive connector positioned externally of the reservoir, the attaching assembly including a threaded portion extending from the spacer and a nut body for engagement with the threaded portion, the threaded portion extending through a hole in the reservoir with the spacer in position inside the reservoir and the nut body being positioned on the outside of the reservoir engaging the threaded portion.

2. The conductivity detector assembly as in claim 1, further comprising a seal positioned between a portion of the spacer proximate the attaching assembly to provide a seal between the spacer and the hole in the reservoir for preventing leakage of beverage retained in the reservoir.

3. The conductivity detector assembly as in claim 1, further comprising the spacer having an external surface which is generally conical to facilitate shedding of water from the surface of the spacer and away from the conductive portion.

4. The conductivity detector assembly as in claim 3, further comprising the external surface of the generally conical structure having a slope angle of approximately from 10°–45° relative to a central axis of the spacer.

5. The conductivity detector assembly as in claim 1, further comprising positioning the detector on a bottom surface of the reservoir, the spacer having a generally vertical dimension which is sufficient to space the exposed conductive portion away from the bottom of the reservoir.

6. A conductivity detector assembly for use with a hot water dispenser for detecting a volume of liquid in a beverage reservoir associated with the hot water dispenser, the conductivity detector assembly comprising:
   a non-conductive spacer having an exterior surface for facilitating shedding of liquid therefrom, the spacer having a first end and a second end;
   an exposed conductive portion positioned on the first end of the spacer;
   an exposed conductive connector extending from the second end of the spacer generally distal the first end;
   a conductive path coupled to the exposed conductive portion and the exposed conductive connector for transmitting a conductivity signal between the exposed conductive portion and the exposed conductive connector; and
   an attaching assembly for attaching the detector assembly to the reservoir with the exposed conductive portion positioned inside the reservoir and the exposed conductive connector positioned externally of the reservoir, the attaching assembly including a threaded portion extending from the spacer and a nut body for engagement with the threaded portion, the threaded portion extending through a hole in the reservoir with the spacer in position inside the reservoir and the nut body being positioned on the outside of the reservoir engaging the threaded portion.

7. The conductivity detector assembly as in claim 6, further comprising a seal positioned between a portion of the spacer proximate the attaching assembly to provide a seal between the spacer and the hole in the reservoir for preventing leakage of beverage retained in the reservoir.

8. The conductivity detector assembly as in claim 6, further comprising the spacer having an external surface which is generally conical to facilitate shedding of water from the surface of the spacer and away from the exposed conductive portion.

9. The conductivity detector assembly as in claim 8, further comprising the external surface of the generally conical structure having a slope angle of approximately from 10°–45° degrees relative to a central as of the spacer.

10. The conductivity detector assembly as in claim 6, further comprising positioning the detector on a bottom surface of the reservoir, the spacer having a generally vertical dimension which is sufficient to space the exposed conductive portion away from the bottom of the reservoir.

* * * * *